United States Patent Office 3,262,890
Patented July 26, 1966

3,262,890
MANUFACTURE OF SHAPED CRYSTALLINE
ZEOLITIC MOLECULAR SIEVE BODIES
William J. Mitchell and Vincent C. Raab, Kenmore, N.Y.,
assignors to Union Carbide Corporation, a corporation
of New York
No Drawing. Filed Oct. 5, 1960, Ser. No. 60,552
14 Claims. (Cl. 252—455)

This invention relates to shaped porous adsorbent bodies, and more particularly relates to articles of manufacture comprising shaped crystalline zeolitic molecular sieve adsorbent bodies and to methods for manufacturing such bodies.

Refrigerants, particularly those of the halogenated fluorocarbon type such as difluorodichloromethane and monochlorodifluoromethane, are frequently dried using a solid desiccant in order to prevent the buildup of water and ice in the refrigeration system. Because of their high water capacities per unit volume, particularly at low partial pressures, molecular sieve adsorbents are well suited for this use.

Molecular sieve adsorbents previously used in the drier cartridges of refrigeration systems have often been in the form of clay-bonded pellets or beads as described and claimed in copending application Serial No. 620,177 filed November 5, 1956, now Patent No. 2,973,327, in the name of W. J. Mitchell et al. However, a substantial portion of the cartridge volume is unfilled by such shapes and the voids consequently represent an inefficiency in the drying operation. Furthermore, the pellets and beads tend to disintegrate and dust in the cartridge due to the fluid flowing therethrough, and this additionally increases the void volume.

To overcome these problems, the prior art has employed shaped molecular sieve bodies consisting of hydrated alumina particles and 5 to 10 percent zeolite type 4A particles bonded with cellulose acetate or calcium aluminate. These bodies or blocks are shaped to fit in the sealed refrigerant cartridges. However, when the blocks are sectioned, it is found that the molecular sieve particles are quite easily dislodged from the mass. It appears that the aforementioned binders simply bind together the hydrated alumina particles which in turn mechanically hold the molecular sieve particles in place. These blocks have low strength and their volumetric adsorption capacity is low.

Attempts to bind 14 x 30 mesh ziolite type 4A particles with calcium aluminate cement, or calcium aluminate and sodium silicate, or aluminum phosphate have proved unsuccessful. It appears that the alkaline nature of the molecular sieve particles adversely affects the binders, and that conventional binding techniques are not suitable for preparing shaped bodies containing uniformly dispersed molecular sieves.

An object of this invention is to provide a shaped porous body containing uniformly dispersed discrete particles of active crystalline zeolitic molecular sieve adsorbent. Another object is to provide such a body which additionally has the characteristics of high strength, high volumetric adsorption capacity, and strong retention of the molecular sieve particles despite any shaping operation. A further object is to provide an economical method for manufacturing such bodies.

Additional objects and advantages of the invention will be apparent from the ensuing disclosure and the appended claims.

One aspect of the invention contemplates a method for manufacturing shaped porous crystalline zeolitic molecular sieve adsorbent bodies in which a mixture of the zeolitic molecular sieve and a clay mineral binder is provided and granulated, and initially fired at a temperature sufficiently high to simultaneously dry the clay mineral binder, bind the mixture, and activate the molecular sieve. The firing temperature must be below the point at which the molecular sieve is structurally unstable. Sodium silicate and water are added to the granular molecular sieve-clay binder mixture, and in a preferred embodiment the sodium silicate is added partly in the powder form and partly in solution form. The addition of sodium silicate is in quantities such that the total silicate content of the product porous molecular sieve body is between about 9% and 25% by weight on a bone-dry basis, and the moisture content is between about 12% and 25% by weight before the final firing step. The aqueous sodium silicate solution is then mixed with the activated mixture for sufficient duration so as to form a free-flowing blend of uniformly distributed molecular sieve particles in a sodium silicate matrix. The resulting blend is uniformly pressurized and shaped for sufficient duration to provide the porous product body. As a final step, the body is fired at temperatures between about 350° and 650° C.

The term "zeolite," in general, refers to a group of naturally occurring and synthetic hydrated metal aluminosilicates, many of which are crystalline in structure.

There are, however, significant differences between the various synthetic and natural materials in chemical composition, crystal structure and physical properties such as X-ray powder diffraction patterns.

The structure of crystalline zeolitic molecular sieves may be described as an open three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off substantially all of the water of hydration. The space remaining in the crystals after activation is available for adsorption of adsorbate molecules having a size, shape and energy which permits entry of the adsorbate molecules into the pores of the molecular sieves.

Any type of crystalline zeolitic molecular sieve may be employed in the present method to provide an adsorbent body according to the invention. The selection of the particular sieve will depend on factors such as the apparent pore size of the material, and the end use of adsorbent body. For example, the pores must be at least large enough to receive the desired adsorbate molecule. In the case of refrigerant drying, the pores are preferably less than about 4.9 Angstroms in diameter so as to permit the passage of the water molecule and exclude the larger halogenated hydrocarbon molecules.

Among the naturally occurring crystalline zeolitic molecular sieves are erionite, chabazite, analcite, faujasite, clinoptilolite and mordenite. The natural materials are adequately described in the chemical art. Synthetic zeolitic molecular sieves include zeolites A, T, X and Y.

Zeolite A is a crystalline zeolitic molecular sieve which may be represented by the formula:

wherein M represents a metal, $n$ is the valence of M, and $y$ may have any value up to about 6. The as-synthesized zeolite A contains primarily sodium ions and is designated sodium zeolite A or zeolite 4A. Zeolite A is described in more detail in U.S. Patent No. 2,882,243 issued April 14, 1959.

Zeolite T is a synthetic crystalline zeolitic molecular sieve whose composition may be expressed in terms of oxide mole ratios as follows:

$$(1.1 \pm 0.4x)Na_2O:(1-x)K_2O:Al_2O_3:6.9 \pm 0.5SiO_2:yH_2O$$

wherein "$x$" is any value from about 0.1 to about 0.8 and "$y$" is any value from about zero to about 8. Further characterization of zeolite T by means of X-ray diffraction techniques is described in U.S. Patent No. 2,950,952 issued August 30, 1960.

Zeolite X is a synthetic crystalline zeolitic molecular sieve which may be represented by the formula:

$$0.9 \pm 0.2M_{2/n}O:Al_2O_3:2.5 \pm 0.5SiO_2:yH_2O$$

wherein M represents a metal, particularly alkali and alkaline earth metals, $n$ is the valence of M, and $y$ may have any value up to about 8 depending on the identity of M and the degree of hydration of the crystalline zeolite. Sodium zeolite X has an apparent pore size of about 10 Angstrom units. Zeolite X, its X-ray diffraction pattern, its properties, and methods for its preparation are described in detail in U.S. Patent No. 2,882,244 issued April 14, 1959.

Zeolite Y is described and claimed in U.S. patent application Serial No. 728,057 filed April 14, 1958 and in U.S. patent application Serial No. 862,062 filed December 28, 1959, both in the name of D. W. Breck.

The clay binder should be semi-plastic or plastic in the presence of water at atmospheric temperatures and capable of acquiring a substantial "green" strength upon exposure for short periods of time to the drying process of the air. Examples of clays which may be employed for bonding molecular sieves without substantially altering the adsorptive properties of the molecular sieve are attapulgite, kaolin, sepiolite, polygarskite, kaolinite, plastic ball clays, clays of the attapulgite or kaolin types, bentonite, montmorillionite, illite, chlorite, and bentonite-type clay. Of these clays, the last five pass through an irreversible phase change above 700° C. which is above the temperature at which most molecular sieves lose their structural stability. Thus, if any of these five clays are to be used as a binder for such molecular sieves, the bonded product is only dried and activated rather than fired so as to effect the irreversible phase change in the clay.

The bonded molecular sieves are prepared by blending or mixing a binder and the sieve so as to form agglomerates. The agglomerates are in turn hardened by the setting of the binder. In a preferred practice the clay binder, molecular sieve and sufficient moisture to render the clay pliant are blended together. The mixture is extruded through a die, broken into small particles such as pellets and the binder hardened by drying.

The amount of clay used in making the bonded materials depends upon the strength required in the final product and the degree of dilution of the molecular sieves permissible. For most purposes a clay content of from 5% to 35% by weight of the final agglomerate is satisfactory and good results have been obtained with a clay content of as little as 1% and as high as 40% by weight. A preferred range for most applications is from 10% to 25% of clay by weight of agglomerate.

The agglomerates, however, prepared, are fired in a kiln at elevated temperatures. Both rotary and stationary furnaces have been found satisfactory for this firing step.

The maximum temperature for the initial firing step is the highest temperature at which the molecular sieve is structurally stable. This is generally below about 700° C. In addition, a dry purge gas is preferably passed through the furnace during the firing operation to minimize the loss of adsorptive capacity of the molecular sieve.

The minimum temperature for firing the bonded molecular sieves is that temperature at which the clay will dry to give a bound product and at which the loss of the water of hydration of the molecular sieve will be effected. For best results, the clay-bonded molecular sieve should be fired at the temperature wherein the clay undergoes an irreversible phase change. This provides a product having maximum strength and attrition-resistance. However, this temperature will in some cases lie above the temperature at which the molecular sieve loses its structural stability. In such cases, the clay should only be dried.

The fired agglomerate of crystalline zeolitic molecular sieve bonded with a clay mineral is granulated by suitable grinding techniques to provide particles larger than the powderous size, that is, as coarse as 8 mesh and as fine as 50 mesh. Screening may be necessary to obtain the desired sizing. It is important for purposes of this invention that the fired agglomerate not be ground to the powderous form since this would lead to a shaped body of high density, low porosity and high pressure drop.

Alternatively, the granulating step may be performed before the initial firing step. In any event, it is important that fired particles of molecular sieve and binder be used to prepare the blend to be shaped; if "green" particles from the screening were added directly to the mix without firing, they would be too soft to withstand subsequent blending with sodium silicate. The result would be a "mushy" mix of partly disintegrated particles, which after shaping and firing would give a dense article rather than the desired porous body having discrete particles of active molecular sieve adsorbent in a silicate matrix. The refrigerant or other fluid from which one desires to remove an adsorbable component or impurity should be able to flow through the porous structure of the sodium silicate matrix without encountering appreciable resistance to such flow, thereby coming in intimate contact with the activated particles of clay-bonded molecular sieve, and thereafter at least a part of the adsorbable component is adsorbed from the fluid by the molecular sieve zeolite. By achieving a granular free-flowing mix according to a preferred form of the invention, crushing and breakup of the clay-bonded particles before and during the shaping step are minimized, and thus the identity of the molecular sieve adsorptive body is retained in the shaped product.

In the next step, a quantity of activated molecular sieve particles in suitable mesh size, such as 14 x 30, combined with a clay binder are mixed with sodium silicate powder in suitable blending apparatus such as the ribbon type. The blender bowl is preferably preheated beforehand by suitable means such as steam in a jacket. This improves the blending efficiency. With the blender running, a solution of sodium silicate and water is added to the mix. Steam resulting from the heat of adsorption of water by the activated molecular sieve may be purged from the blender by a suitable gas such as compressed air. After several minutes of mixing, the mix is preferably partially cooled by admitting water to the blender jacket. The mix, which at room temperature is now a free-flowing blend of uniformly distributed molecular sieve particles in a sodium silicate matrix, is now ready for the shaping step. Alternatively, the aqueous sodium silicate solution and the granular molecular sieve-clay binder mixture may be combined and the powderous sodium silicate added thereto.

Simply adding sodium silicate solution to activated molecular sieve particles produces a sticky mass, which while satisfactory for producing a few shapes on an individual or laboratory-scale basis, tends to agglomerate and ball up during mixing and cooling. On a production basis, this method would require additional crushing and screening steps, with a concomitant dusting problem, before the shaping operation could begin. In the preferred procedure outlined above, the step of combining some of the sodium silicate in powder form is the key to solving the problem of agglomeration and stickiness. That is, if sufficient sodium silicate powder is added, the latter adsorbs enough liquid to reach the saturation point without creating a dusting problem.

Control of the moisture content of the mass to be shaped is also important if the blend is to be free-flowing and readily amenable to the shaping operation. It has been found that the blend becomes sticky and tends to set up at room temperature if the moisture content exceeds about 25%. On the other hand, it is extremely difficult to form articles from the blend when the moisture content is below about 12%. The preferred moisture content of the blend to be shaped is about 18 to 19.5% by weight. At this preferred content the silicate-coated particles of molecular sieve can be measured out easily and quickly by volumetric techniques common in the ceramic industry. It should be understood that the previously discussed moisture content ranges refer to the shaped article before the final firing step as considerable moisture is removed thereby so as to activate the article.

It has been found that the articles of the present invention may be formed having a total silicate content of between about 9% and 25% by weight, and preferably between about 15% and 20% by weight. The latter provides an optimum balance of physical strength and adsorption capacity. If the total silicate content of the shaped article or of the mix is reduced below about 15% the strength of the article is appreciably reduced. On the other hand, if the silicate content in the blend is above about 20%, the strength of the shaped product is increased but with an unnecessary loss of adsorptive capacity.

The silicate may be added in either the liquid solution form, or alternatively and preferably in partly powder form and partly liquid form. In the latter case, the weight ratio of powder silicate to solution silicate can be as low as 1 to 3 and as high as 3 to 1. A ratio of 1 to 1 is preferred.

The blend prepared in the previously described manner is amenable to the preparation of adsorbent bodies in a variety of shapes and sizes. For example, the blend may be shaped in the form of hollow cylinders, cubes and the like with a closed end, or hollow cones of various tapers with a closed end, depending on the geometry of the particular cartridge or other outer container required for the adsorption system. In one embodiment of the present invention, a molecular sieve adsorbent article was manufactured for use as a refrigerant desiccant in the form of a hollow conical body 2 inches outside diameter at the open end, tapering 5 degrees to 1⅝ inch outside diameter at the closed end, and 2⅛ inches long. The relatively simple shape of this article, exemplary of the useful shapes capable of being manufactured according to the method, conveniently permits production of these articles on a large scale.

Shaping of the blend may be accomplished by a suitable mold or die. A predetermined quantity of the granular, free-flowing blend is loaded into the mold or die. Before the shaping step, it is preferable to preheat the blend to temperatures in the range of about 50° to 70° C., and preheat the die assembly or assemblies to at least 100° C. The advantage of the preheating step is more uniform distribution of the constituents through the assembly cavity.

The blend in the mold is pressurized by convenient means as for example compacted by pressing in a hydraulic press or by vibrating on a controlled vibration device. Hydraulic pressure is preferably applied to both ends of the assembly to assure uniform flow of blend and thereby achieve uniform density throughout the mold cavity without crushing the particles of molecular sieve.

It was found that to simply air-dry the articles shaped from the granular of free-flowing blend and then calcine them at about 600° C. resulted in a somewhat weak and dusty product. Accordingly, it is preferred to hydrate the shaped product before the final firing step. This can be accomplished by, for example, exposing freshly molded articles to water-saturated air at ambient temperature for several hours, exposing freshly molded articles to saturated steam at atmospheric pressure for a period of from about 5 to 30 minutes, spraying the outer surfaces of the article with sodium silicate solution, or momentarily immersing the article in sodium silicate solution.

The effects of hydration and silicate-hydration treatments on product strength is shown by the data of Tables I and II, respectively. In the Table I tests, a free-flowing granular blend of zeolite 4A, 20% by weight silicate solids (bone-dry basis) and 19.5% $H_2O$ was used to form a molecular sieve articles. All samples were fired at 625° C. before breaking.

TABLE I.—INFLUENCE OF HYDRATION ON STRENGTH

| Sample No. | Treatment After Forming | Block Weight, g. | Breaking Strength, lb. |
|---|---|---|---|
| 1 | Hydrated 16 Hours in Air Saturated with Water Vapor. | 11.2 | 49 |
| 2 | Steamed 3 to 4 Minutes | 11.0 | 29 |
| 3 | Air Dried 16 Hours | 11.4 | 4 |

In the Table II tests, a free-flowing granular blend of zeolite 4A, 15% by weight silicate solids (bone-dry basis) and 21% $H_2O$ was used to form a molecular sieve article according to the invention.

TABLE II.—INFLUENCE OF SPRAYING ON STRENGTH

| Sample No. | Treatment After Forming | Block Weight, g. | Breaking Strength, lb. |
|---|---|---|---|
| 1 | Not Treated | 11.7 | 4 |
| 2 | Sprayed With 8 grams of 20% by weight "BW" Silicate Solution.[1] | 11.9 | 8 |
| 3 | Not Treated | 11.9 | 8 |
| 4 | Sprayed With 8 grams of 20% by weight "BW" Silicate Solution.[1] | 12.1 | 15 |

[1] The "BW" silicate solution itself has the following composition: 19.5% $Na_2O$, 31.2% $SiO_2$ and 49.3% $H_2O$.

The standard method of determining moisture adsorption is in the McBain System, where the samples are activated under vacuum and then water vapor is admitted from a bulb of water which is maintained at 20° C., giving a vapor pressure of 17.5 mm. of mercury. It is standard to observe the amount of moisture adsorbed in 90 minutes and the total equilibrium moisture adsorbed after many hours.

There is another test which permits the obtainance of moisture adsorptions on many samples over long periods of time, even though the results are not as accurate nor reliable as those obtained on the McBain. This test consists of placing a saturated solution of ammonium sulfate in the bottom of a large vessel and placing weighed activated samples on top of a screen above the solution. The closed vessel is placed in a cabinet where the temperature is relatively constant, along with a temperature recorder which would indicate any major changes in temperature in that compartment. Since the air above the saturated ammonium sulfate solution has a relative humidity of only 80% in the range of 20° C. to 30° C., a temperature reversal of a few degrees in the surroundings will not condense moisture on the samples. The vessel containing the ammonium sulfate solution is known as the "hydrator."

The results of a number of moisture adsorption tests from both the McBain System and the hydrator are tabulated in Table III. It will be observed that for a given starting mix, the method of treatment makes little difference to the moisture adsorption rate. Also, it may be observed that there is good agreement between the results obtained on the McBain and those obtained in the hydrator tests. On the other hand, there does seem to be a significant difference between the mix where all of the silicate is "BW" and the mix where there is a mixture of "BW" plus SS–C–200 silicate, in that the latter has somewhat higher adsorption rate. The greater importance of the moisture adsorption tests is that it gives an assurance that the method of treatment has not reduced the moisture capacity of the molecular sieve excessively.

TABLE III.—MOISTURE ABSORPTION VS. TREATMENT

| Sample No. | Treatment of Samples | | | Percent H₂O Absorbed After Time Indicated | | | | | |
|---|---|---|---|---|---|---|---|---|---|
| | Firing Temp., °C. | Method of Hydration | Type Silicate | 90 Min. | 20 Hr. | 44 Hr. | 70 Hr. | 89 Hr. | |
| 1 | 500 | Hyd.—16 hr | "BW" | — | 9 | 12 | 15 | — | Hyd. |
| | | | | 8 | — | — | — | 19 | McB. |
| 2 | 625 | Hyd.—16 hr | "BW" | — | 7 | 8 | 9 | — | Hyd. |
| 3 | 625 | Dry Only | "BW" | — | 8 | 9 | 10 | — | Hyd. |
| 4 | 625 | Steamed | "BW" | — | 8 | 9 | 10 | — | Hyd. |
| | | | | 10 | — | — | — | 17 | McB. |
| 5 | 625 | Steamed Mix | "BW" | — | 5 | 7 | 8 | — | Hyd. |
| 6 | 500 | Hyd.—16 hr | "BW" plus SS-C-200 [1] | — | 11 | 13 | — | — | Hyd. |
| | | | | 9 | — | — | — | 20 | McB. |
| 7 | 625 | Hyd.—16 hr | "BW" plus SS-C-200 [1] | — | 11 | 12 | — | — | Hyd. |
| | | | | 8 | — | — | — | 14 | McB. |
| 8 | 625 | Steamed | "BW" plus SS-C-200 [1] | — | 12 | 13 | — | — | Hyd. |
| | | | | 13 | — | — | — | 18 | McB. |
| 9 | 625 | Dry Only | "BW" plus SS-C-200 [1] | — | 13 | 13 | — | — | Hyd. |
| 10 | 625 | Clay Bonded Control (No Silicate) | | — | 20 | 21 | 21 | — | Hyd. |
| | | | | 21 | — | — | — | 25 | McB. |

[1] The SS-C-200 silicate has the following analysis: 32.4% Na₂O, 64.8% SiO₂ and 2.8% H₂O.

The strength of the shaped articles from the standpoint of both mechanical and thermal shock was investigated. For the purpose of testing the breaking strength, samples were molded in the form of disks 1½ in. diameter x ½ in. thick.

The breaking strength test is carried out by placing a disk horizontally across the legs of a channel, in which the legs are one inch apart. A ⅜ in. diameter metal bar is placed on top of the disk and pressure applied through crushing strength tester. The highest pressure applied before the disk breaks is taken as the "breaking strength." Since the equipment is only calibrated to 50 lb., this is the highest breaking strength recorded. Disks which break at 40 lb. or higher are considered strong enough for all practical purposes.

The first major problem encountered with the free-flowing, granular mass of silicate-coated mesh was the strength of the formed product. As previously stated, it was found that by hydrating the product after forming but before firing, the strength could be improved. As was seen in Table I, the break strength of a disk which was simply formed, dried and fired, was only 4 lb. The strength of a duplicate disk which was steamed for four minutes before firing was 29 lb. If duplicate disks were allowed to stand in an atmosphere completely saturated with water vapor for 16 hours, the fired strength would increase to 44 to 49 lb. Although there was a 5 lb. difference in breaking strength between disks fired at 500° C. and those fired at 625° C., it is believed that this difference is not significant in this particular set of tests.

Several acceptable ways of forming the blend prior to shaping are described in the following examples, Procedure D being especially preferred for large-scale production use.

Procedure A

In this example, 150 grams of bone-dry zeolite 4A agglomerate of 14 x 30 mesh consisting of 20% clay binder and 80% molecular sieve material were hydrated so that the final mix contained 18% water and weighed 180 grams. This material was then mixed with 90 grams of "BW" silicate solution in a paddle-type mixer for 5 minutes. This time was adequate to obtain complete coating of the agglomerate particles with the silicate solution. The blend was allowed to stand for 30 minutes, and the resulting mass was sticky.

Procedure B

In this example, 400 grams of activated, clay bonded type 4A molecular sieve agglomerate of 14 x 30 mesh size were placed in a mixing bowl along with the mixer, and the entire assembly placed in an oven which was heated to approximately 100° C. A solution was prepared consisting of 200 grams of "BW" silicate powder and 100 grams of water, and the solution was placed in the same oven at 100° C. After a suitable time the bowl and mixer were assembled and while still hot the sodium silicate solution was poured into the bowl with the agitator operating at intermediate speeds. After it had cooled the blend was forced through a 10 mesh screen with fines removed by a 25 mesh screen. In one sample the shaped article contained 20.6% water and 20% silicate (on a bone-dry basis).

Procedure C

In this example, 400 grams of activated clay bonded type 4A molecular sieve agglomerate of 14 x 30 mesh size were mixed in an agitator with a stainless steel bowl at the intermediate speed setting, with 25 grams of type SS-C-200 silicate powder. With the agitator still operating, a solution consisting of 140 grams of "BW" silicate and 85 grams of water was added. Mixing was continued for 10 minutes and during this time the mixture heated up considerably due to the heat of wetting of the molecular sieve, and a large portion of the water was driven off. All of the resulting blend passed through an 8-mesh screen but was forced through a 10-mesh screen. The 10 x 25 mesh fraction weighed 550 grams and contained 19.5% water.

Procedure D

In a typical example of a preferred embodiment 9080 grams of activated type 4A zeolite were mixed with 1135 grams of SS-C-200 sodium silicate powder in a ribbon blender. The blender bowl was preheated with steam in the jacket, but the steam was turned off before the mixing started. With the blender running, a solution consisting of 2270 grams of "BW" sodium silicate and 1930 grams of water was poured into the mix. The steam, resulting from the heat of wetting of the molecular sieve, was purged from the blender with a blast of compressed air. After a few minutes of mixing, cooling water was passed through the jacket of the blender and the mix partially cooled. Finally, the mix was dumped into a drum and the moisture determined. The final product contained 18.6% water. On a bone-dry basis the blend contained approximately 10% sodium silicate as SS-C-200 silicate powder and 10% sodium silicate as "BW" silicate solids.

It can thus be seen that by the present invention, shaped bodies of relatively massive section containing a high percentage of active crystalline zeolitic molecular sieve adsorbent may be manufactured in a variety of shapes with sodium silicate as the bonding medium. Specific embodiments may be used as filter blocks for dehydrator cartridges to be incorporated into refrigeration systems, but it is contemplated that the adsorbent bodies can be employed for a variety of adsorption applications other than the drying of refrigerants. These shaped articles may be partially the reslut of a chemical interaction, characterized by high final strength, but at the same time there is no appreciable diminution of the original adsorption properties of the clay-bonded particles despite the presence of the silicate binder.

Although preferred embodiments of the invention have been described in detail, it is contemplated that modifications of the method and the article may be made and that some features may be employed without others, all within the spirit and scope of the invention.

What is claimed is:

1. A method for manufacturing shaped porous crystalline zeolitic molecular sieve adsorbent bodies comprising the steps of providing a mixture of said zeolitic molecular sieve and a clay mineral binder; granulating and initially firing said mixture at a temperature sufficiently high to simultaneously dry said clay mineral binder, bind the mixture, and activate the molecular sieve, the firing temperature being below that temperature at which said crystalline zeolitic molecular sieve is structurally unstable; adding powderous sodium silicate to the granular molecular sieve-clay binder mixture; adding an aqueous sodium silicate solution to the activated mixture containing powderous sodium silicate, the addition of powderous and aqueous sodium silicate being in quantities such that the total silicate content of the porous molecular sieve bodies is between about 9% and 25% by weight and the total moisture content is between about 16% and 20% by weight; mixing said aqueous sodium silicate solution with said activated mixture for sufficient duration so as to form a free-flowing blend of uniformly distributed molecular sieve particles in a sodium silicate matrix; uniformly pressurizing and shaping such blend for sufficient duration to provide said porous crystalline zeolitic molecular sieve body; and finally firing such body at temperatures between about 350° and 650° C.

2. A method according to claim 1 in which sodium zeolite A is said zeolitic molecular sieve.

3. A method according to claim 1 in which the sodium silicate solution is added to said activated mixture in quantities such that the total moisture content of said porous molecular sieve bodies is between about 18 and 19.5%.

4. A method according to claim 1 in which a die assembly is provided for the blend shaping step, said die assembly is preheated to at least 100° C., and said free-flowing blend of uniformly distributed molecular sieve particles is preheated to between about 50 and 70° C. before introduction to the preheated die assembly for uniform pressurization therein.

5. A method according to claim 1 in which the shaped molecular sieve body is hydrated before the final firing step.

6. A method according to claim 1 in which the shaped molecular sieve body is contacted with moisture-saturated air at ambient temperature before the final firing step.

7. A method according to claim 1 in which the shaped molecular sieve body is contacted with saturated steam at atmospheric pressure for a period of between about 5 and 30 minutes before the final firing step.

8. A method according to claim 1 in which the shaped molecular sieve body is sprayed with sodium silicate solution before the final firing step.

9. A method according to claim 1 in which the shaped molecular sieve body is immersed in sodium silicate solution before the final firing step.

10. A method according to claim 1 in which the powderous sodium silicate and aqueous sodium silicate are added to said activated mixture in quantities such that the total silicate content of the porous molecular sieve bodies is between about 15% and 20% by weight.

11. A method according to claim 1 in which the shaped molecular sieve body is finally fired at temperatures between about 600° and 625° C. and in an atmosphere of moving air.

12. A method for manufacturing shaped porous crystalline zeolitic molecular sieve adsorbent bodies comprising the steps of providing a granulated agglomerate of said zeolitic molecular sieve and a clay mineral binder, said agglomerate having been formed from a mixture into a mass and fired at a temperature sufficiently high to simultaneously dry said clay mineral binder, bind the mixture, and activate the molecular sieve, the firing temperature being below that temperature at which said crystalline zeolitic molecular sieve is structurally unstable; adding powderous sodium silicate to said granulated agglomerate; adding an aqueous sodium silicate solution to the powderous sodium silicate-containing granulated agglomerate, the addition of powderous and aqueous sodium silicate being in quantities such that the total silicate content of the porous molecular sieve bodies is between about 15% and 20% by weight and the total moisture content is between about 18% and 19.5% by weight; mixing said aqueous sodium silicate solution with the agglomerate for sufficient duration so as to form a free-flowing blend of uniformly distributed molecular sieve particles in a sodium silicate matrix; preheating said free-flowing blend to temperature between about 50° and 70° C.; providing a die assembly and preheating such assembly to a temperature of at least 100° C.; adding the preheated free-flowing blend to the preheated die assembly; uniformly hydraulically pressurizing and shaping such blend in the die assembly so as to produce said porous crystalline zeolitic molecular sieve body; hydrating the shaped body at ambient temperature; and finally firing such hydrated shaped body at temperatures between about 350° and 650° C.

13. A method for manufacturing shaped porous zeolite A molecular sieve adsorbent bodies comprising the steps of providing a mixture of said zeolite A molecular sieve and a clay mineral binder; granulating the said mixture to a particle size of about 14 x 30 mesh and initially firing same at a temperature sufficiently high to simultaneously dry said clay mineral binder, bind the mixture, and activate the molecular sieve, the firing temperature being below that temperature at which said crystalline zeolitic molecular sieve is structurally unstable; adding powderous sodium silicate to the granular molecular sieve-clay binder mixture; adding an aqueous sodium silicate solution to the activated mixture containing powderous sodium silicate, the addition of powderous and aqueous sodium silicate being in quantities such that the total silicate content of the porous molecular sieve bodies is between about 9% and 25% by weight and the total moisture content is between about 16% and 20% by weight; mixing said aqueous sodium silicate solution with said activated mixture for sufficient duration so as to form a free-flowing blend of uniformly distributed molecular sieve particles in a sodium silicate matrix; uniformly pressurizing and shaping such blend for sufficient duration to provide said porous crystalline zeolitic molecular sieve body; and finally firing such body at temperatures between about 350° and 650° C.

14. A method for manufacturing shaped porous crystalline zeolitic molecular sieve adsorbent bodies comprising the steps of providing a mixture of said zeolitic molecular sieve and a clay mineral binder; granulating the said mixture to a particle size of about 8 x 50 mesh and initially firing same at a temperature sufficiently high to simultaneously dry said clay mineral binder, bind the mixture, and activate the molecular sieve, the firing temperature being below that temperature at which said crystalline zeolitic molecular sieve is structurally unstable; adding powderous sodium silicate to the granular molecular sieve-clay binder mixture; adding an aqueous sodium silicate solution to the activated mixture containing powderous sodium silicate, the addition of powderous and aqueous sodium silicate being in quantities such that the total silicate content of the porous molecular sieve bodies is between about 9% and 25% by weight and the total moisture content is between about 16% and 20% by weight; mixing said aqueous sodium silicate solution with said activated mixture for sufficient duration so as to form a free-flowing blend of uniformly distributed molecular sieve particles in a sodium silicate matrix; uniformly pressurizing and shaping such blend for sufficient duration to provide said porous crystalline zeolitic molecular sieve body; and finally firing such body at temperatures between about 350° and 650° C.

References Cited by the Examiner

UNITED STATES PATENTS

| | | | |
|---|---|---|---|
| 2,063,302 | 12/1936 | Eversole | 252—470 |
| 2,261,517 | 11/1941 | Greger | 252—477 |
| 2,292,632 | 8/1942 | Greger | 252—455 |
| 2,973,327 | 2/1961 | Mitchell et al. | 252—449 |
| 3,039,953 | 6/1962 | Eng | 252—455 |
| 3,055,841 | 9/1962 | Gladrow et al. | 252—455 |

OSCAR R. VERTIZ, *Primary Examiner.*

JULIUS GREENWALD, MAURICE A. BRINDISI, *Examiners.*

W. S. BROWN, E. J. MEROS, *Assistant Examiners.*